(12) United States Patent
Tal et al.

(10) Patent No.: US 9,262,430 B2
(45) Date of Patent: Feb. 16, 2016

(54) DEDUPLICATION IN A STORAGE SYSTEM

(71) Applicant: Kaminario Technologies Ltd., Yokne'am ILIT (IL)

(72) Inventors: Doron Tal, Haifa (IL); Eyal Gordon, Haifa (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 341 days.

(21) Appl. No.: 13/684,205

(22) Filed: Nov. 22, 2012

(65) Prior Publication Data
US 2014/0143213 A1 May 22, 2014

(51) Int. Cl.
*G06F 17/30* (2006.01)

(52) U.S. Cl.
CPC .................. *G06F 17/30156* (2013.01)

(58) Field of Classification Search
CPC ............ G06F 17/30867; G06F 17/30569; G06F 17/30312
USPC .................. 707/692, 803, 831, 813
See application file for complete search history.

(56) References Cited

U.S. PATENT DOCUMENTS

| | | | | |
|---|---|---|---|---|
| 7,403,949 B2* | 7/2008 | Cannon | ............ | G06F 17/30489 |
| 7,788,300 B2* | 8/2010 | Kuck | ................. | G06F 12/0253 707/813 |
| 7,945,543 B2* | 5/2011 | Kennedy | ............ | G06F 17/30306 707/696 |
| 7,953,711 B2* | 5/2011 | Soman | ................. | G06F 12/0276 707/693 |
| 7,953,772 B2* | 5/2011 | Simeonov | ............ | G06F 11/0709 707/813 |
| 7,962,707 B2* | 6/2011 | Kaakani | ............. | G06F 12/0269 707/813 |
| 7,975,114 B2* | 7/2011 | Tene | .................... | G06F 12/0269 707/813 |
| 7,991,807 B2* | 8/2011 | Rossmann | .......... | G06F 12/0261 707/813 |
| 2007/0294281 A1* | 12/2007 | Ward | ..................... | G06Q 50/01 |
| 2008/0256143 A1* | 10/2008 | Reddy | ............... | G06F 17/30212 |
| 2013/0060739 A1* | 3/2013 | Kalach | ............. | G06F 17/30159 707/692 |
| 2014/0006354 A1* | 1/2014 | Parkison | ........... | G06F 17/30194 707/649 |

* cited by examiner

*Primary Examiner* — Ahmed Abraham
(74) *Attorney, Agent, or Firm* — Wiggin and Dana LLP; Gregory S. Rosenblatt; Jonathan D. Hall

(57) ABSTRACT

A IO handler receives a write command including write data that is associated with a LBA. The IO handler reserves a deduplication ID according to the LBA with which the write data is associated, within the scope of each LBA, each deduplication ID is unique. The IO handler computes a hash value for the write data. In case a deduplication database does not include an entry which is associated with the hash value, the IO handler: provides a reference key which is a combination of the LBA and the deduplication ID; adds to the deduplication database an entry which is uniquely associated with the hash value and references the reference key; and adds to a virtual address database an entry, including: the reference key; a reference indicator indicating if there is an entry that is associated with the present entry; and a pointer to where the write data is stored.

26 Claims, 10 Drawing Sheets

DEDUPLICATION IN A STORAGE SYSTEM

TECHNOLOGICAL FIELD

The present invention is in the field of storage systems and relates to managing data in a storage system that implements deduplication.

GENERAL DESCRIPTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

According to an aspect of the presently disclosed subject matter there is provided a system including: a deduplication database, a virtual address database and a IO handler. The IO handler can be adapted to receive at a storage system a first write command including a first write data that is associated with a first logical block address. In respect of the first write data, the IO handler can be configured to reserve a deduplication ID for the first write data according to the logical block address with which it is associated, wherein deduplication IDs are assigned such that within the scope of each logical block address, each deduplication ID is unique. The IO handler can be configured to compute a first hash value based on the first write data. In case the deduplication database does not include an entry which is associated with the first hash value, the IO handler can be further configured to: provide a first virtual address reference key which is a combination of the first logical block address and the first deduplication ID; add to the deduplication database an entry which is uniquely associated with the first hash value and which references the first virtual address reference key; and add to the virtual address database a first virtual address entry, including: the first virtual address reference key; a reference indicator indicating whether or not there is at least one virtual address entry that is associated with the first virtual address entry; and a pointer pointing to a storage location where the first write data is stored.

According to a further aspect of the presently disclosed subject matter there is provided a method comprising: receiving a first write command at a storage system including a first write data that is associated with a first logical block address; in respect of the first write data: computing a first hash value based on the first write data; providing a first virtual address entry for the first write data, including: a first virtual address reference key which is a combination of the first logical block address and a first deduplication ID, wherein deduplication IDs are assigned such that within the scope of each logical block address each deduplication ID is unique; a reference indicator indicating whether or not there is at least one virtual address entry that is associated with the first virtual address entry; a first pointer pointing to a storage location where the first write data is stored.

According to yet a further aspect of the presently disclosed subject matter, there is provided a program storage device readable by machine, tangibly embodying a program of instructions executable by the machine to perform a method comprising: receiving a first write command at a storage system including a first write data that is associated with a first logical block address; in respect of the first write data: computing a first hash value based on the first write data; providing a first virtual address entry for the first write data, including: a first virtual address reference key which is a combination of the first logical block address and a first deduplication ID, wherein deduplication IDs are assigned such that within the scope of each logical block address each deduplication ID is unique; a reference indicator indicating whether or not there is at least one virtual address entry that is associated with the first virtual address entry; a first pointer pointing to a storage location where the first write data is stored.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
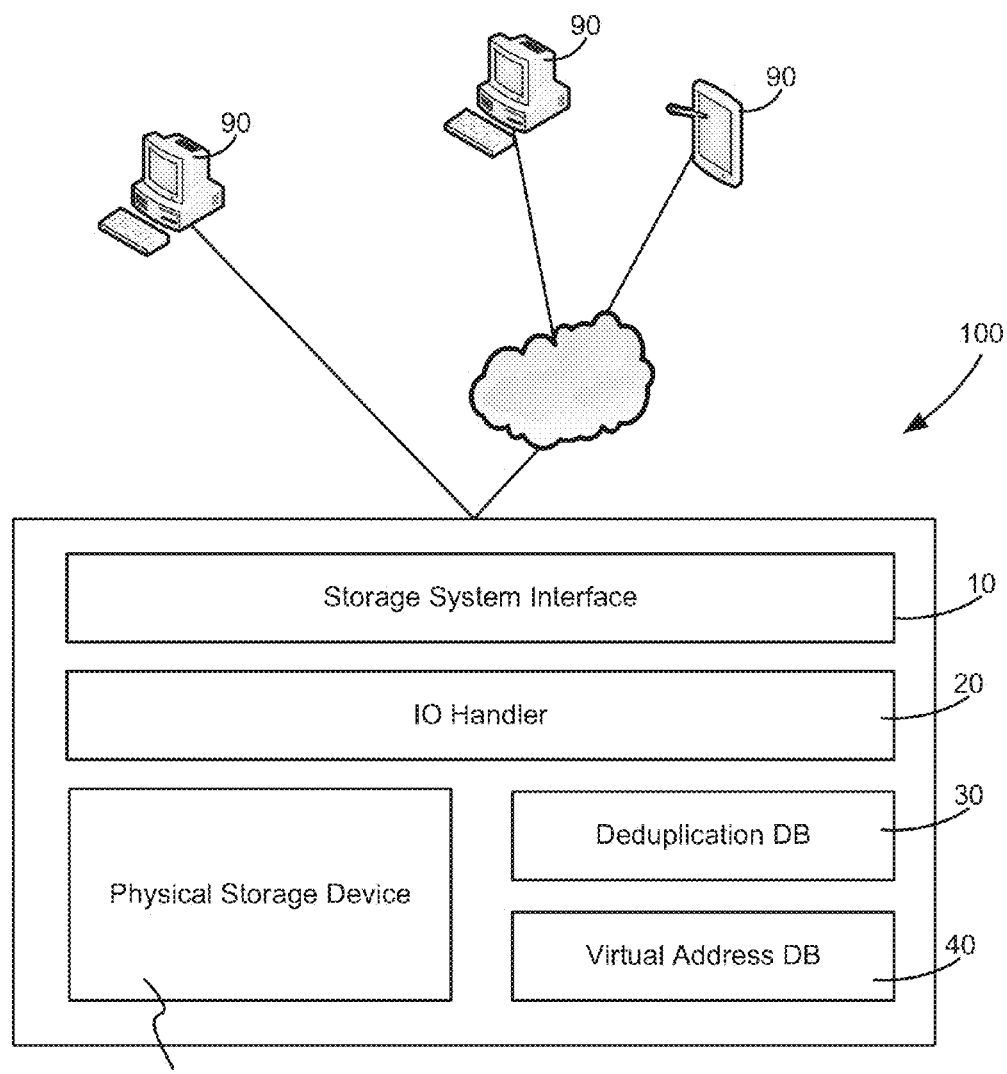
FIG. 1 is a block diagram illustration of a storage system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

Throughout the description and the claims, reference is made to the term "logical unit volume" or "LU volume" in abbreviation. The term LU volume (or logical unit volume) is known in the art of digital storage, and the following definition is provided as a non-limiting example only for convenience purposes. Accordingly, the interpretation of the term LU volume in the claims, unless stated otherwise, is not limited to the definitions below and the term LU volume should be given its broadest reasonable interpretation. The term LU volume as used herein relates to a logical unit created by a volume create request or an equivalent request. For example, in the SCSI storage protocol, an LU volume is created by such a volume create request.

The term "logical block address" or "LBA" in abbreviation as used herein, relates to the basic reference unit which is used by external hosts to address IO requests to the storage system. LBAs can be numerical and range from 1-n. A partly or an entirely overlapping LBA range (e.g., 1-n) can be used with multiple, different volumes (e.g., all the volumes) in the storage system, and therefore in order to reference a specific logical block, a reference to the volume with which the logical block or snapshot layer chunk is associated may be required. For simplicity, in the description of examples of the presently disclosed subject matter the IO requests reference LBA and the existence of multiple volumes in the storage system is not mentioned. It would be appreciated, that this omission is made with the intention of simplifying the description of the examples of the presently disclosed subject matter, and is not intended to limit the scope of the description. Therefore, it would be appreciated that examples of the presently disclosed subject matter encompass a multi-volume storage system and that the LBAs which are referred to herein can be comprised of a combination of an LBA and a volume ID (e.g., LU number).

It should be appreciated that the above addressing scheme is merely one possible implementation of an addressing scheme and is used herein by way of example only, and in further examples of the presently disclosed subject matter, different addressing schemes may be used. For example, in a different addressing scheme, each volume in the storage system can be associated with a different range of LBAs, and in such a case there is no need to reference the volume ID when referring to LBAs.

Reference is initially made to FIG. 1 which is a block diagram illustration of a storage system according to examples of the presently disclosed subject matter. According to examples of the presently disclosed subject matter, the storage system can be configured to store data and to provide storage services to one or more hosts 90 which can be connected to the storage system 100 directly or through a network (e.g., over the Internet). The storage system 100 can include an interface 10 for supporting communications with the external hosts 90. For example, the interface 10 can receive IO requests from the hosts and can assign the IO requests to the appropriate components of the storage system 100.

The storage system 100 can further include an IO handler 20, a deduplication database 30, a virtual address database 40 and a physical storage device 50. The configurations and operations which are implemented or carried out by each of the IO handler 20, the deduplication database 30, the virtual address database 40 and the physical storage device 50 according to examples of the presently disclosed subject matter, are provided below.

Figure 2:
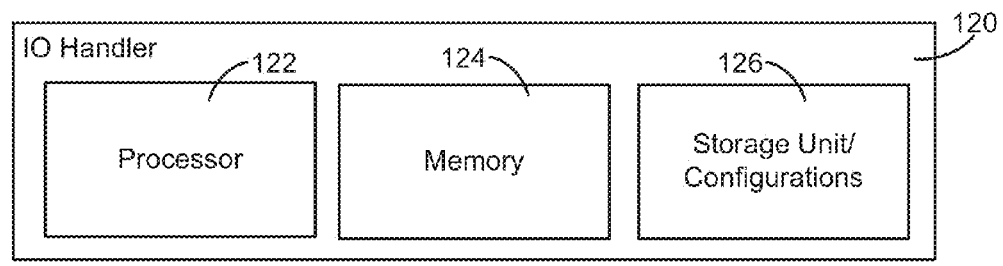
FIG. 2 is an expanded view of the IO handler according to examples of the presently disclosed subject matter.

FIG. 2, to which reference is now made, is an expanded view of the IO handler according to examples of the presently disclosed subject matter. According to examples of the presently disclosed subject matter, the IO handler 120 can include a processor 122, a memory 124 and a storage unit 126 which stores the configurations or logic which are used by the IO handler 120. According to examples of the presently disclosed subject matter, the processor 122, a memory 124 and a storage unit 126 are utilized by the IO handler 120 to perform the operations which are carried out by the IO handler 120 according to the examples of the presently disclosed subject matter.

Figure 3:
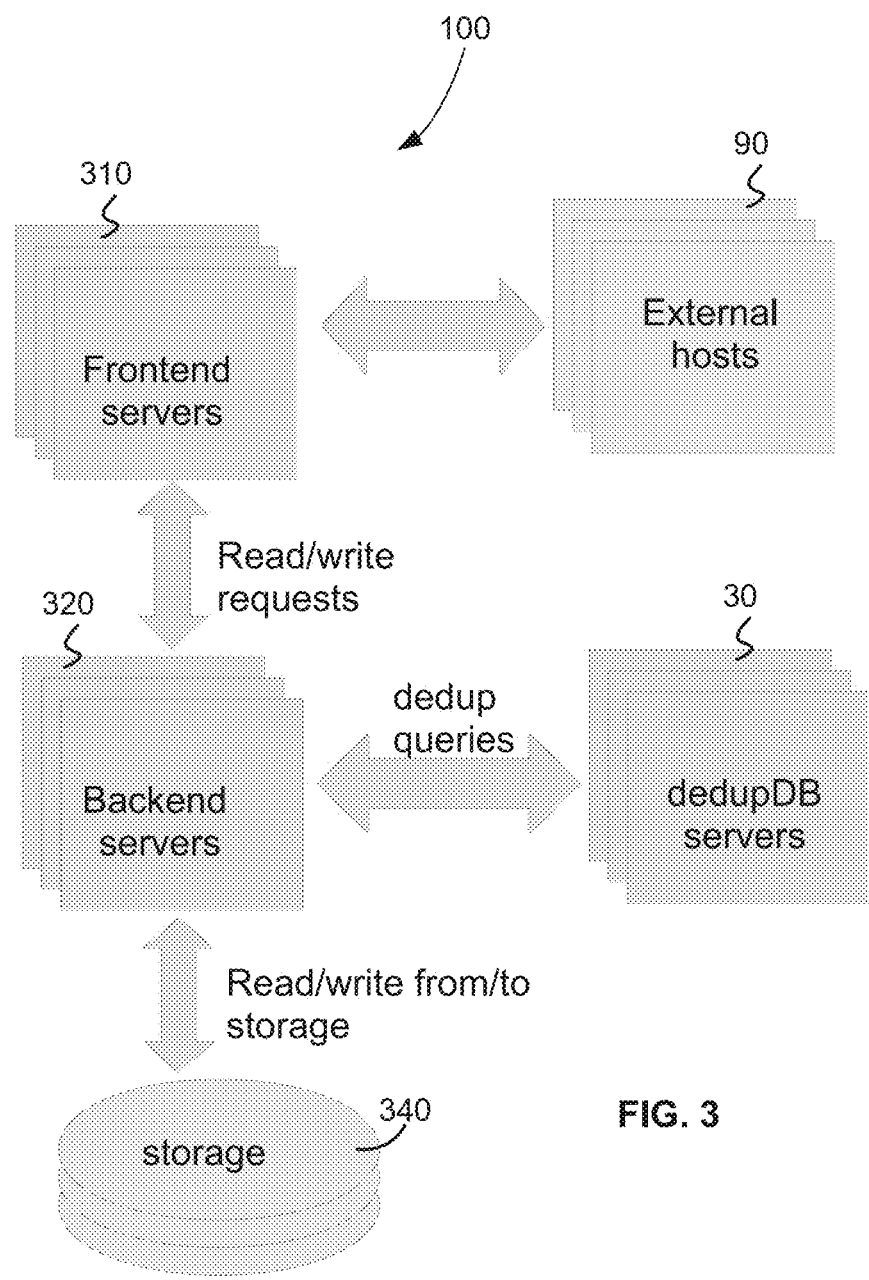
FIG. 3 is a high-level block diagram illustration of a distributed implementation of a distributed storage system that supports deduplication according to examples of the presently disclosed subject matter.

Reference is now additionally made to FIG. 3, which is a high-level block diagram illustration of a distributed implementation of a distributed storage system that supports deduplication according to examples of the presently disclosed subject matter. According to examples of the presently disclosed subject matter, the distributed storage system 100 can include a plurality of front end servers 310, a plurality of back end servers 320, a plurality of deduplication database servers 30 and a plurality of storage devices 340. It would be appreciated that, according to examples of the presently disclosed subject matter, each of: the front end servers 310, the backend servers 320 and the deduplication database servers 30 can be implemented as services running on computer hardware, and that each of: the front end servers 310, the backend servers 320 and the deduplication database servers 30 can run on a single computer hardware unit or can be distributed across a plurality of discrete computer hardware units.

According to examples of the presently disclosed subject matter, the logical address space of the storage system 100 can partitioned so that for every logical address, there is at least one backend server 320 which is responsible for it. Further by way of example, there is a certain range or space of possible hash value which can be computed for write data in the system, and the range or space of possible hash value can be partitioned such that for any (possible) hash value there is at least one deduplication database server 40 which is responsible for it. Further by way of example, frontend 310 and backend 320 servers can hold a translation tables or implement translation functions which map from logical address to the backend server which is responsible for that address. Still further by way of example, backend servers 320 also hold a table or implement a translation function which maps from virtual address (which will be described below) to the deduplication database server 30 which is responsible for that address.

According to examples of the presently disclosed subject matter, the backend servers 320 serve requests from the frontend severs 310. The backend servers 320 are adapted to write the write data to the storage 340 (e.g., hard drive disks, flash drives and other solid state drives, etc.) and hold metadata which allows reads and writes, this metadata can also include metadata which is related to deduplication.

According to examples of the presently disclosed subject matter, the backend server 320 holds a map from logical addresses to a list of virtual addresses which are associated with the logical addresses with which each one of the backend servers is associated. According to examples of the presently disclosed subject matter, the mapping between virtual addresses and respective data location is stored in the virtual address database 40. Still further by way of example, the BE 320 can be configured to maintain additional metadata in respect of various virtual addresses. As will be described in further detail below, according to examples of the presently disclosed subject matter, each virtual address entry includes a pointer, which either points to a storage location or to another virtual address entry. The storage locations which are pointed to can be local, which means that the pointer is to an actual (including virtual) storage location rather than pointer to another virtual address (which either include a pointer to the actual storage location or which itself points to another virtual address). When the virtual address entry includes a pointer to a storage location of the write data, the storage location can reside in a storage device on the same node as the BE server where the virtual address entry is stored, or it can be external to the BE server, e.g. it can be on some other backend server or it can even be separate from any of the backend servers. According to examples of the presently disclosed subject matter, some or all virtual address entries can include additional metadata related to the deduplication process, as will be described below.

The deduplication database stored on the deduplication database servers 30 holds mappings from each one of a plurality of hash values of write data segments to virtual addresses which hold a pointer to the storage location of the respective write data. By way of example, each virtual address is represented by a respective virtual address reference key. Virtual address reference key according to examples of the presently disclosed subject matter are described below. According to examples of the presently disclosed subject matter, the deduplication database is configured to store at most one virtual address reference key per each distinct hash value. According to examples of the presently disclosed subject matter, if two different write data segments share the same hash value a hash collision exists. This is not to be confused with the case where the same write data is associated with two (or more) logical addresses. The latter case is not a hash collision. According to examples of the presently disclosed subject matter, in the case of a hash collision among two or more write data segments only one of the write data segments can be deduplicated. Examples of the presently disclosed subject matter which include handling of two different write data segments that share the same hash value, and examples of the presently disclosed subject matter which include handling of hash collision shall be described below.

In further examples of the presently disclosed subject matter, two or more virtual address entries can be associated with a certain hash value in the deduplication database such that the write data associated with each one of the two or more virtual address entries that are associated with the same hash value is different from the write data that is associated with the other virtual address entry, even though they share the same hash value. Further by way of example, if the hash value that is computed for an incoming data write segment is found in the deduplication database (and it is thus associated with an existing virtual address), then the virtual address reference key that is associated with the existing virtual address entry can be obtained from the deduplication database, and can be used to obtain the write data that is associated with the existing virtual address entry, and the write data that is associated with the existing virtual address entry can be compared with the incoming write data. This process can be repeated for each virtual address reference key that is listed in the deduplication database in associated with the hash value which is equal to the hash value of the incoming write data to either find a matching write data or to determine that there isn't an existing virtual address entry that is associated with the same write data as the incoming write data. If no matching data is found after comparing the incoming write data with all of the write data of these virtual address entries which share the same hash value, then it is possible to either add to the deduplication database in associated with the hash value a new virtual address reference key which is associated with the new virtual address entry, or to avoid doing so, such that the incoming write will not be deduplicated (its virtual address entry will not include a invalid deduplication indicator). The format a metadata which is included in a non-deduplicated virtual address entry is described below.

According to examples of the presently disclosed subject matter, the deduplication database servers 330 can support various actions including: lookup_and_store(hash_value, new_virtual_address) and remove_mapping(hash_value).

The lookup_and_store(hash_value, new_virtual_address) operation involves checking if the input hash values (hash_value) is already mapped to a virtual address reference key. By way of example, if it is determined that the input hash values is already mapped to a virtual address reference key, the existing virtual address reference key to which the input hash values is mapped is returned. Further by way of example, the existing virtual address reference key to which the input hash values is already mapped can be returned to the backend server 320 which sent the query to the deduplication database, for further processing, as will be described below. Otherwise, if the deduplication database 330 does not return a virtual address reference key which is already associated with the input hash value, the deduplication database 330 can be configured to add an entry to the database 330 mapping the input virtual address reference key (new_dedup_virtual_address) to the input hash value (hash_value), and return an acknowledge notification to the backend server 320 that issued the query.

The remove_mapping(hash_value) operation involves removing a mapping for the input hash_value. By way of example the remove mapping operation can be called (e.g., by an IO handler 20) when a backend server 320 has a virtual address entry whose reference count reaches zero and is removed. The metadata included in a virtual address entry, and the counter increment operation shall be described below. A backend server 320 which removed a virtual address entry whose reference count reached zero, can be configured to implement a delay, e.g., by a predefined period of time, before invoking the remove mapping function. Still by way of example, in such a case, some other BE server 320 can attempt to compare write data (e.g., new write data) to a write data pointed by a virtual address entry referenced by a virtual address reference key found in the deduplication DB, and may fail.

According to examples of the presently disclosed subject matter, the front ends servers (collectively abbreviated herein "FE") 310 can be configured to receive IO requests (e.g., read and write requests) from external hosts 90. Upon receiving an IO request, the respective FE 310 can be configured to determine with which LBA the IO request is associated. The FE 310 can use address mapping tables (or mapping functions) to determine, based on the logical address referenced in the IO request, to which backend server from the plurality of back-end servers 320 to address the IO request.

According to examples of the presently disclosed subject matter, the back-end servers (collectively abbreviated herein "BE") 320 can each be associated with a set of logical addresses. According to examples of the presently disclosed subject matter, the IO handler 20 can be implemented as part of the BE 320. In this regard, it would be appreciated that the IO handler 20 can be a distributed component. The BE 320 can also be configured to hold the virtual address database 40, which can also be implemented as a distributed component which is distributed over a plurality of back-end servers 320.

Having provided a high level description of the various components of the storage system, more details are now provided with respect to the operation of the storage system. The following description is made with reference to a method according to examples of the presently disclosed subject matter. It should be appreciated, that the examples of the method, although described with reference to the various components of the system presented above, are not limited to being implemented on such components and can be implemented on any suitable computer hardware or hardware/software combination.

Figure 4:
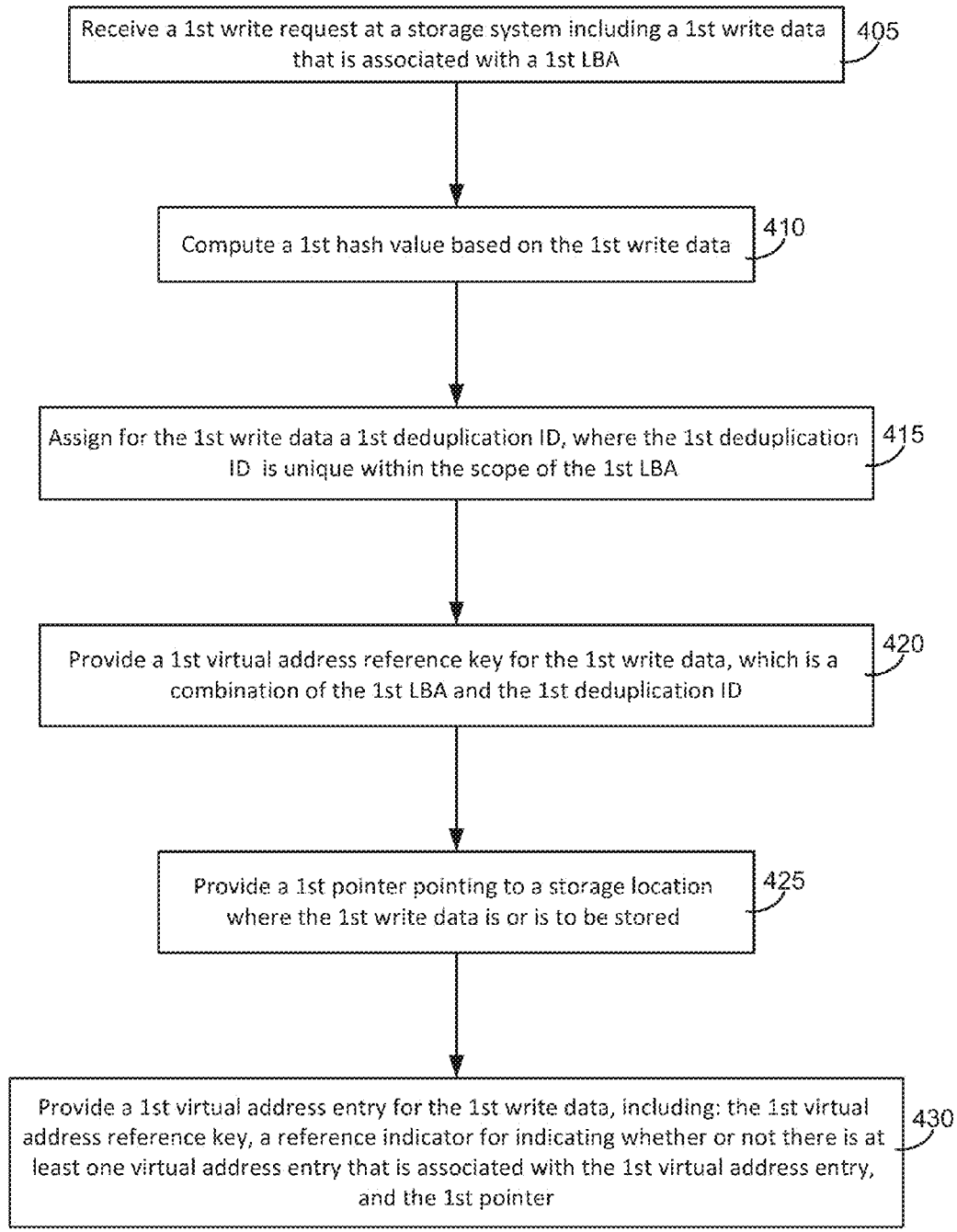
FIG. 4 is a flow chart illustration of a method according to examples of the presently disclosed subject matter.

Referring now to FIG. 4, there is shown a flow chart illustration of a method according to examples of the presently disclosed subject matter. The flow starts with the receipt of a first write request at the storage system 100 including a first write data that is associated with a first LBA (block 405). Note that the term "first" as used herein does not mean the very first write request, write data, LBA, hash value, deduplication ID, virtual address entry, virtual address reference key or pointer; rather it is used to distinguish from a "second" write request, write data or LBA. Likewise, "second", "third", "fourth", etc. are also meant to distinguish among different write requests, write data, LBAs, hash values, deduplication IDs, virtual address entries, virtual address reference keys or pointers.

By way of example, the write request is received by one of the FE servers 310, which determines to which BE server 320 the write request should be directed, for example, according to the LBA which is referenced in the request.

It would be appreciated that a write request from a host 90 can reference a plurality of LBAs and is not necessarily addressed to just one LBA. The FE server which receives the write request determines in the domain of which BE server(s) the LBA(s) referenced in the request fall, and distributes the write data to the appropriate BE servers. It would be appreciated that FE servers can also distribute incoming write requests or parts of incoming write requests among themselves.

According to examples of the presently disclosed subject matter, metadata is generated, maintained and used at the virtual address level, which is a superset of the LBAs in the system. Thus, according to examples of the presently disclosed subject matter, the write data which is associated with each single LBA is handled independently of the write data that is associated with other LBAs. For convenience, the following description refers to the handling a write data which is associated with a single LBA, but it would be appreciated that in case a IO request is associated with two or more (e.g., three, four, . . . , n) LBAs, the process described herein can be carried out in a similar manner in respect of each one of the LBAs with which the IO request is associated.

Next, a first hash value is computed based on the first write data (block 410). According to examples of the presently disclosed subject matter, the BE server 320 which is associated with the first LBA with which the first write data is associated receives the first write data from the FE server 310, and the IO handler 20 computes the first hash value based on the first write data. Different hash functions and computations can be used for computing the hash value based on the write data.

The IO handler 20 can be further adapted to assign to the first write data a first deduplication ID (block 415). According to examples of the presently disclosed subject matter, the IO handler 20 is configured such that deduplication IDs are assigned such that within the scope of each logical block address each deduplication ID is unique.

At block 420, a first virtual address reference key can be provided for the first write data, where the first virtual address reference key is a combination of the first LBA with which the first write data is associated and the first deduplication ID which was assigned to the first write data. As mentioned above, either as part of the LBA or as a separate indicator, the volume ID to which a given LBA belongs can also be used as part of the virtual address reference key. Thus for example, in a storage system that has multiple volumes (each volume is associated with a unique volume ID), where in different volumes there is at least some overlap with other volume(s) LBAs, the virtual address reference can should also include an identifier of the volume to which the LBA belongs. In such cases, the deduplication IDs are assigned such that within the scope of any <volume ID, LBA> each deduplication ID is unique. For example, the first virtual address reference key can be provided by the IO handler 20. The utility of the virtual address, and of the metadata which is used with the virtual address entry, shall become apparent from the following description.

At block 425 a first pointer is provided in association with the first write data, where the first pointer points to a storage location where the first write data is or is to be stored. For example, the first pointer can be provided by the IO handler 20. Further by way of example, the BE 320 can be associated with one or more storage devices 340 and can hold a mapping from virtual addresses which the BE 320 manages to storage locations in the storage device(s) which are associated with the BE 320. In case there are several BE servers, each BE can be associated with a different set of storage devices (physical or virtual) and can hold a mapping from virtual addresses which the BE 320 manages to storage locations in the storage device(s) which are associated with the BE 320. In a further example, some or all of the storage devices can be shared amongst some or all of the BE servers 320.

At block 430, a first virtual address entry is provided for the first write data. The first virtual address entry can include: the first virtual address reference key, a reference indicator for indicating whether or not there is at least one virtual address entry that is associated with the first virtual address entry, and the first pointer.

According to further examples of the presently disclosed subject matter, the IO handler 20 can be further configured to include in the first virtual address entry a validity indicator. According to examples of the presently disclosed subject matter, the validity indicator can indicate whether the first write data with which the first virtual address entry is associated is the latest data that is written to the first logical block address, or not. In still further examples of the presently disclosed subject matter, the reference indicator can be a counter which can be used, e.g., by the IO handler 20, to count the number of virtual addresses that are associated with the first virtual address entry. Further by way of example, the number of virtual addresses which are associated with the first virtual address entry can include the first virtual address entry itself and any virtual address entries which reference the first virtual address entry.

According to examples of the presently disclosed subject matter, the sequence of operations shown in FIG. 4 is implemented when it is determined that the first hash value is not already associated with an existing virtual address entry or when due to other considerations the system decides to avoid checking whether or not the first hash value is already associated with an existing virtual address entry. Such other consideration can include for example performance considerations. Examples of performance consideration can include the following (a) during high IO stress, the system may avoid deduplication. (b) The user may wish to disable deduplication for certain data addresses/volumes for which they believe the benefit will not be worth the performance penalty.

A description of a scenario in accordance with examples of the presently disclosed subject matter, where the first hash value is associated with an existing virtual address entry shall be described below.

It would be appreciated that hosts 90 use logical addresses (LBAs) to address IOs to the storage system 100, e.g., in order to read/write data from/to the system. Thus, any logical block address can only point to a single data segment in the storage device (physical or virtual). When certain write data is first stored in the storage system, the metadata for that write data can point to the actual storage location (physical or virtual) of the write data. The metadata of subsequent yet identical write data can point to the address in which the data was previously written. If this is the case, then it implies that a single LBA may point to more than one data item, since the logical address must continue pointing to the data item as long as other addresses point to it, even if the logical address is rewritten and its pointer needs to point to another location where the logical addresses updated write data is stored. Examples of the presently disclosed subject matter implement virtual addresses and store certain metadata in databases in order to address this issue, as will be apparent for the present disclosure.

It should be noted, that according to examples of the presently disclosed subject matter, a virtual address (or a virtual address entry, which is the system data which represent a virtual address) exists in the system so long as at least one virtual address points to it, including the virtual address itself. This means that a virtual address, say a first virtual address is maintained as long as it is holds the latest data of a certain LBA, say a first LBA, or when there is at least one other virtual address, say a second virtual address, which is associated with another LBA, say a second LBA, where it is the latest data (of the second LBA) and which references the first virtual address in its pointer. This means that the second virtual address entry is associated with the same write data as the first virtual address entry, and although the first virtual address entry is no longer associated with the latest write data within the scope of the first LBA, the second virtual address entry which points to the first virtual address entry is still the latest version of the second LBA, and thus the metadata which is included in the first virtual address entry needs to be maintained.

Virtual Addresses which are not deduplicated, for example, due to hash collision, can be marked, for example, with invalid deduplication indication, to indicate that the respective write data is stored locally and is not referenced by the deduplication DB.

Figure 5:
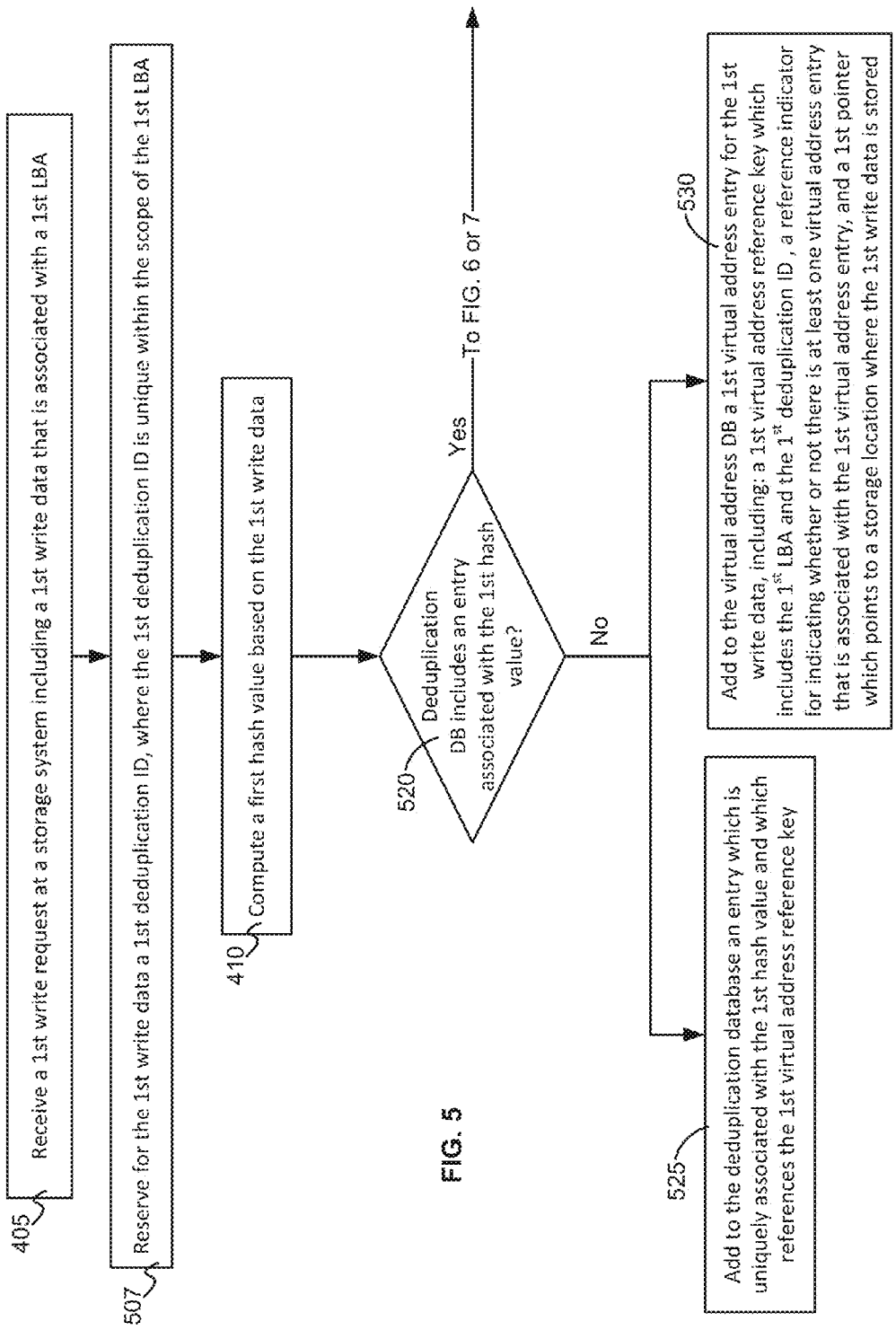
FIG. 5 is a flow chart illustration of an implementation of a method under certain circumstances, according to examples of the presently disclosed subject matter.

Reference is now made to FIG. 5, which is a flow chart illustration of an implementation of a method under certain circumstances, according to examples of the presently disclosed subject matter. According to examples of the presently disclosed subject matter, at block 405, a first write request is received at the storage system 100 including a first write data that is associated with a first LBA. As mentioned above, by way of example, the write request can be received by one of the FE servers and can be forwarded to the appropriate BE server.

According to examples of the presently disclosed subject matter, a first deduplication ID can be reserved for the first write data, and as mentioned above, the deduplication ID which is allocated for the write data is unique within the scope of the respective LBA (in this case the first LBA) (block 507). The need to reserve the deduplication ID at this stage will become apparent from the description below.

Block 410 in which a first hash value is computed based on the first write data, was already referred to above.

At block 520, it is determined whether the deduplication database 30 already includes an entry which is associated with the first hash value. By way of example, the IO handler 20 can use the first hash value which it computed for the first write data to query the deduplication database server(s) 30. If there is already an entry for a hash value that is equal to the first hash value, the query will return the virtual address reference key of the virtual address entry that is already associated with a hash value that is equal to the first hash value. Still further by way of example, if there is no such entry, the deduplication database 30 can return a response with a null value or some other error response, or the deduplication database 30 response which includes the first virtual address reference key. Yet further by way of example, in whichever format the response from the deduplication database 30 is provided, the IO handler 20 can be configured to conclude that the first virtual address entry is the first entry in the storage system which is associated with the first hash value.

In case it is determined that there is no existing entry in the deduplication database 30 for the first hash value, an entry for the first hash value, which references the first virtual address reference key can be added to the deduplication database (block 525), and further in response to determining that there is no existing entry in the deduplication database 30 for the first hash value, a first virtual address entry for the first write data can be added to the virtual address database 40, where under the circumstances leading to block 530 (namely, there is no existing entry in the deduplication database 30 for the first hash value) the first virtual address entry can include the first virtual address reference key, a reference indicator for indicating whether or not there is at least one virtual address entry that is associated with the first virtual address entry, and a first pointer which points to a storage location where the first write data is stored. It would be appreciated that blocks 525 and 530 can be implemented in parallel or in series (one after the other).

Figure 6:
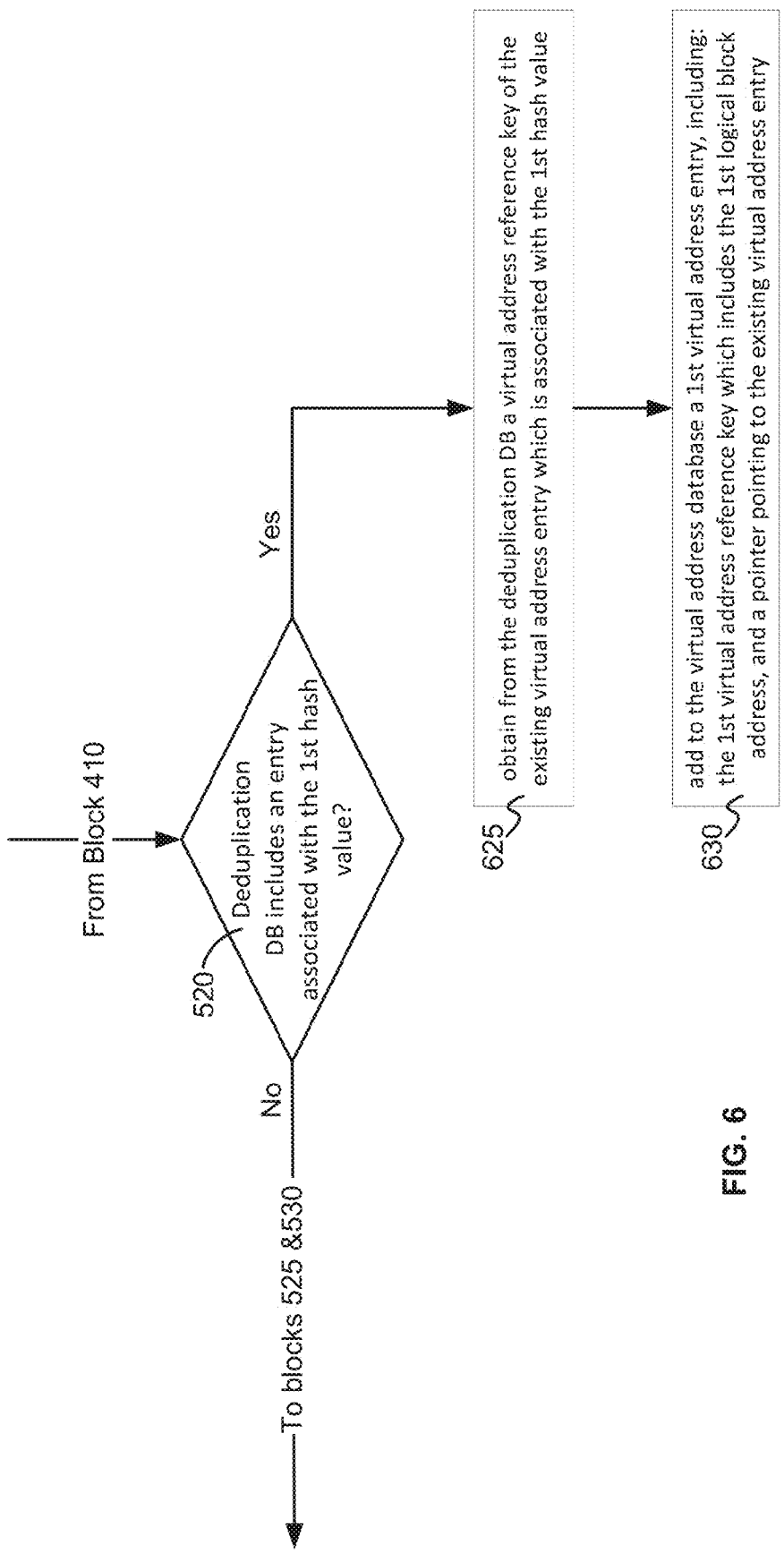
FIG. 6 is a flow chart illustration of an implementation of a method under certain circumstances, according to examples of the presently disclosed subject matter.
Figure 7:
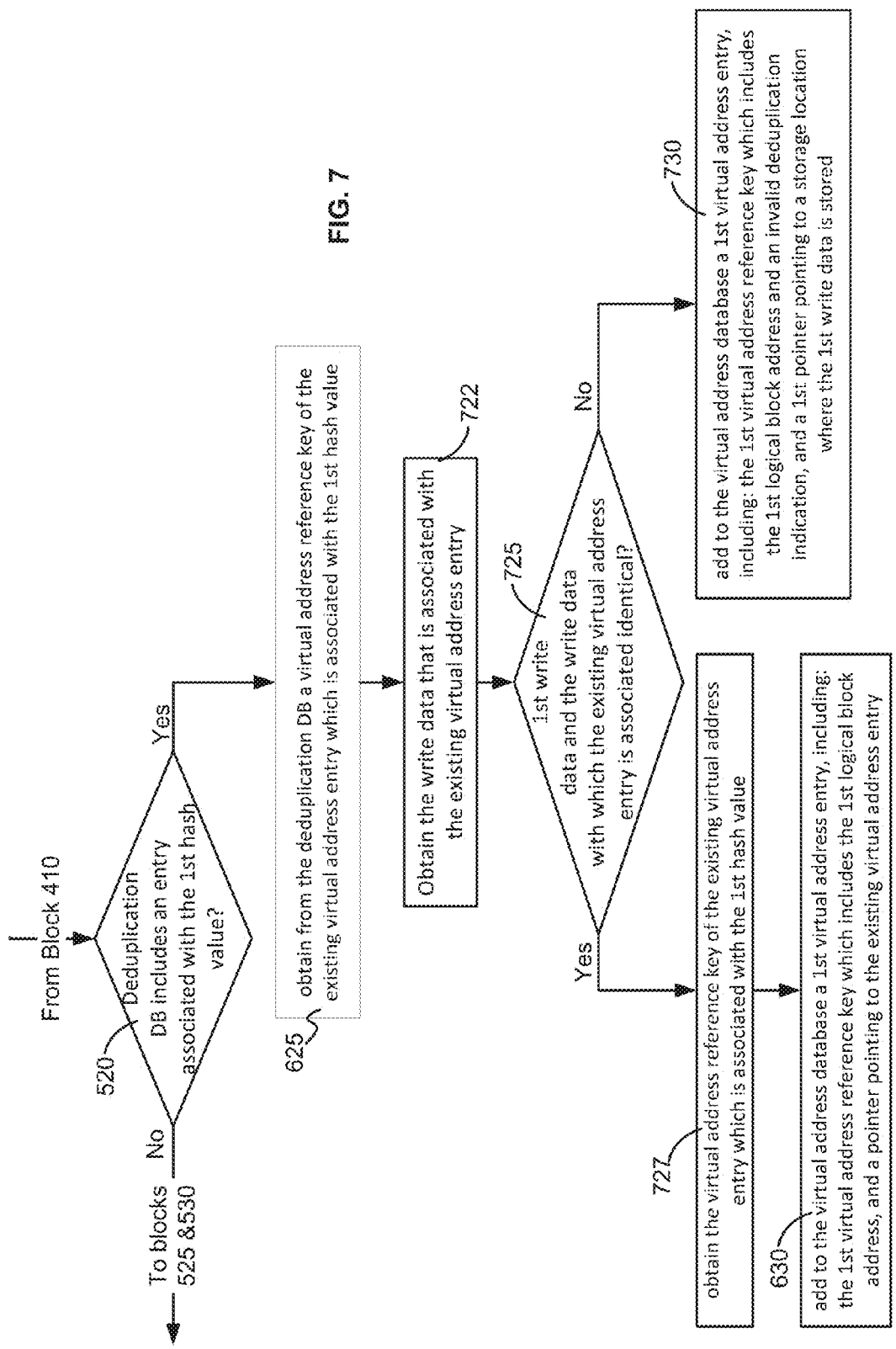
FIG. 7 is a flow chart illustration of an implementation of a method under certain circumstances, according to examples of the presently disclosed subject matter.

Examples of the handling of the case where it is determine at block 520 that there is an existing entry in the deduplication database 30 for the first hash value are illustrated in FIGS. 6 and 7 which will now be described.

Referring now to FIG. 6, there is shown a flow chart illustration of an implementation of a method under certain circumstances, according to examples of the presently disclosed subject matter. FIG. 6 illustrates a possible implementation of a method according to examples of the presently disclosed subject matter, when it is determined at block 520 that there is an existing entry in the deduplication database 30 for the first hash value. Block 520, and preceding blocks which can be implemented in a method according to examples of the presently disclosed subject matter were described above in FIGS. 4 and 5, and should be considered to be part of the description of FIG. 6.

According to examples of the presently disclosed subject matter, following the determination at block 520 that there is an existing entry in the deduplication database 30 for the first hash value, a virtual address reference key of the existing virtual address entry which is associated with the first hash value can be obtained from the deduplication database 30 (block 625). As mentioned above, in some examples, the response from the deduplication database 30, which indicates that there is an existing entry in the deduplication database 30 for the first hash value, can also include the virtual address reference key of the virtual address entry that is already associated with a hash value that is equal to the first hash value.

According to examples of the presently disclosed subject matter, further in response to determining that there is an existing entry in the deduplication database 30 for the first hash value, a first virtual address entry can be added to the virtual address database 40, where under these circumstances leading to block 630 (namely, there is an existing entry in the deduplication database 30 for the first hash value), the first virtual address entry includes the first virtual address reference key which includes the first logical block address, and a pointer pointing to the existing virtual address entry, for example, the virtual address reference key which was returned from the deduplication database 40. According to examples of the presently disclosed subject matter, the virtual address entry of block 630 does not include a deduplication ID. Further by way of example the virtual address reference key to which the pointer in the first virtual address entry point is a combination of another LBA and a deduplication ID that was allocated for that virtual address entry.

It would be appreciated that the use of the deduplication ID enables association of several (e.g., two, three, . . . , n) data write segments with a single logical address by creating a virtual addressing layer over the logical addressing layer. This in turn allows maintaining the metadata (including pointers to storage locations) to a certain write data segment when there are other virtual addresses (one or more) which are associated with the same write data, and using the same storage location for all virtual addresses sharing the same write data instead of duplicating the data, and at the same time the virtual address layer can be used to keep the metadata (including pointers to storage locations) to a certain write data segment (e.g., to be used by other virtual addresses which point to the metadata) when the logical address with which the metadata is associated was overwritten and updated write data was stored in the storage system for that logical address. Thus, according to examples of the presently disclosed subject matter, a deduplication ID (or a valid deduplication ID) can be included in the metadata of a certain virtual address entry (e.g., as part of the virtual address reference key) when the virtual address entry includes a pointer to an actual storage location (or to a virtual storage location) where write data is stored in the storage system, and according to examples of the presently disclosed subject matter, virtual address entries which point to another virtual address (and not to an actual/virtual storage location) do not include a valid deduplication ID, for example, such virtual address entries can include an empty deduplication ID.

In the implementation of the method according to an example of the presently disclosed subject matter which is illustrated in FIG. 6 and which was described above with reference to FIG. 6, there is an assumption that identical hash values mean that the write data is identical. This assumption is based on the hashing algorithm, which can be configured such that, with high enough and acceptable probability, identical hash values are associated with identical write data. For example, the probability is higher than some predefined probability. In another example, the probability is higher than the probability that reading data from the storage returns the same data that was stored. However, in some examples of the presently disclosed subject matter, when it is determined that the deduplication database already includes an entry which has a hash value that is equal to the hash value that was computed for the write data of an incoming write request, the write data segments are compared and the operation of the system depends on the result of the comparison, as will be further discussed now with reference to FIG. 7. FIG. 7 to which reference is now made is a flow chart illustration of an implementation of a method under certain circumstances, according to examples of the presently disclosed subject matter. FIG. 7 illustrates a possible implementation of a method according to examples of the presently disclosed subject matter, when it is determined at block 520 that there is an existing entry in the deduplication database 30 for the first hash value. Block 520, and preceding blocks which can be implemented in a method according to examples of the presently disclosed subject matter were described above in FIGS. 4 and 5, and should be considered to be part of the description of FIG. 7. It would be appreciated that the implementations according to examples of the presently disclosed subject matter, shown in FIG. 6 and in FIG. 7, and the description provided herein with respect to each of FIG. 6 and FIG. 7, are mutually exclusive, and if an algorithm uses one of them, the other one is not used.

According to examples of the presently disclosed subject matter, following the determination at block 520 that there is an existing entry in the deduplication database 30 for the first hash value, a virtual address reference key of the existing virtual address entry which is associated with the first hash value can be obtained from the deduplication database 30. This operation was described above with reference to block 625, and the above description is applicable here. As mentioned above, in some examples, the response from the deduplication database 30, which indicates that there is an existing entry in the deduplication database 30 for the first hash value, can also include the virtual address reference key of the virtual address entry that is already associated with a hash value that is equal to the first hash value.

Using the virtual address reference key of the existing virtual address entry which is associated with the first hash value that was obtained from the deduplication database 30, the write data that is associated with the existing virtual address entry can be obtained (read from a storage location that is pointed to by the metadata in the existing virtual address entry) (block 722).

According to examples of the presently disclosed subject matter, the obtained write data that is associated with the existing virtual address entry can be compared with the first write data which is associated with the first write command to determine if the two write data segments are identical or not (block 725).

According to examples of the presently disclosed subject matter, if it is determined at block 725 that the write data that is associated with the existing virtual address entry and the first write data which is associated with the first write request are identical, than the virtual address reference key of the existing virtual address entry which is associated with the first hash value is obtained (block 727) and 630 which were described above as part of the description of FIG. 6 is implemented. By way of example, the virtual address reference key of the existing virtual address entry which was obtained from the deduplication database at block 625 could be stored in a memory unit and can be pulled from the memory unit when block 727 is implemented.

Further by way of example, if it is determined at block 725 that the write data that is associated with the existing virtual address entry and the first write data which is associated with the first write request are not identical, it is determined that a hash collision occurred, and a first virtual address entry is created for the first write data, where the first virtual address entry includes: the first virtual address reference key which includes the first logical block address and an invalid deduplication indication, and a first pointer pointing to a storage location where the first write data is stored (block 730). The format of the virtual address entry in case of a hash collision indicates that the first virtual address entry cannot be deduplicated, and the first write data which is associated with the first virtual entry has to be stored in the physical (or virtual) storage device.

Figure 8:
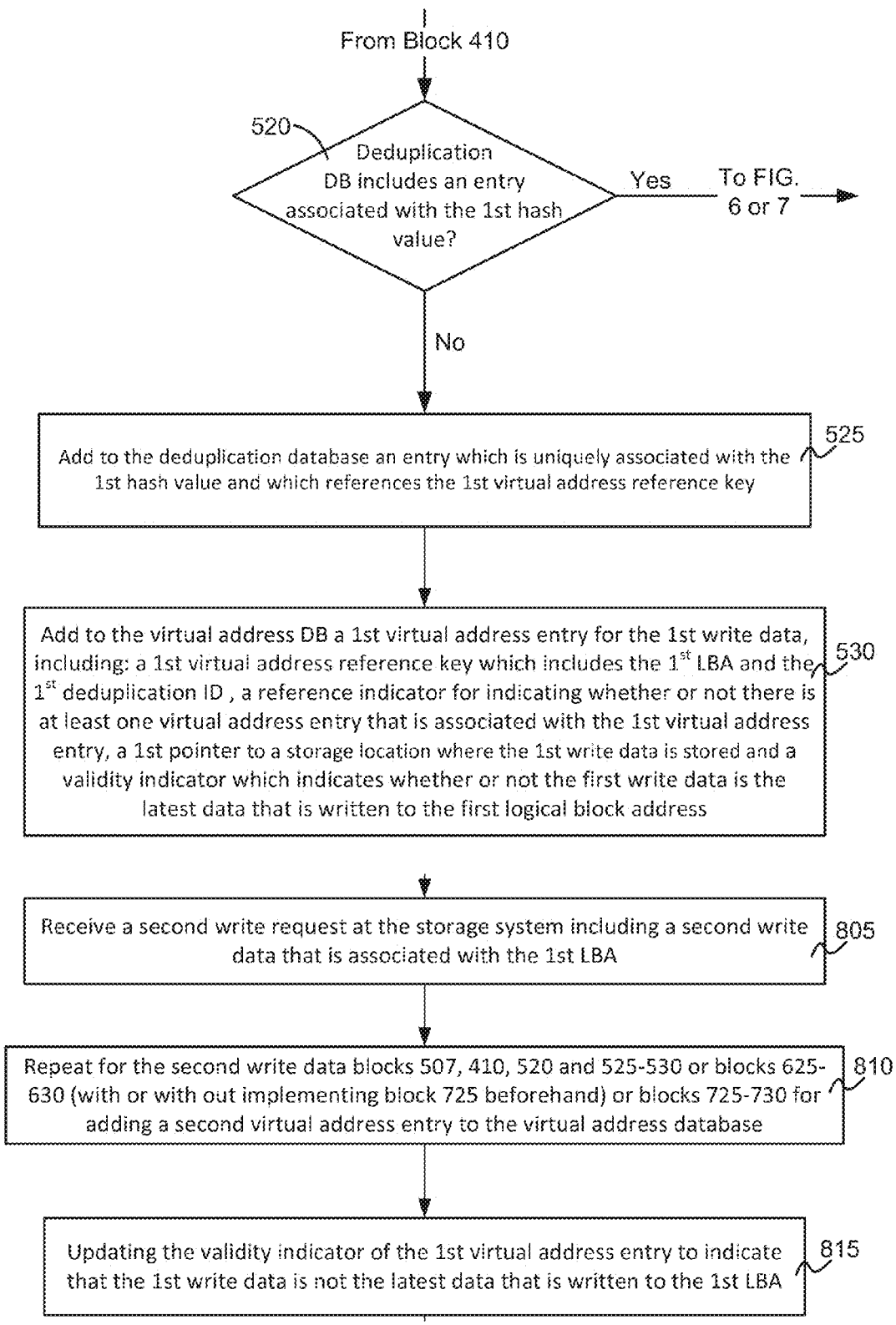
FIG. 8 is a flow chart illustration of an implementation of a method under certain circumstances, according to examples of the presently disclosed subject matter.

Reference is now made to FIG. 8 which is a flow chart illustration of an implementation of a method under certain circumstances, according to examples of the presently disclosed subject matter. In FIG. 8 blocks 520, 525 and 530 describe the inclusion in the virtual address database 40 of a first virtual address entry for a first write data which is associated with a first LBA. Blocks 520, 525 and 530 and preceding blocks which can be implemented in a method according to examples of the presently disclosed subject matter were described above in FIGS. 4 and 5, and should be considered to be part of the description of FIG. 8. It is noted that blocks 525 and 530 are illustrated in FIG. 5 parallel blocks and here in FIG. 8 blocks 525 and 530 are shown to be serial. Both implementations are within the scope of the present disclosure.

As mentioned above, the first virtual address entry includes: a first virtual address reference key which includes the first LBA and the first deduplication ID, a reference indicator for indicating whether or not there is at least one virtual address entry that is associated with the first virtual address entry, a first pointer to a storage location where the first write data is stored, and a validity indicator which indicates whether or not the first write data is the latest data that is written to the first logical block address.

At block 805 a second write request is received at the storage system, where the second write request includes a second write data that is associated with the first LBA. For the sake of illustration, in the scenario illustrated in FIG. 8 and described herein, it is assumed that at the time the second write request is received and processed, the first write data is the latest write data for the first LBA, and the validity indicator in the first virtual address entry indicates that the first write data is the latest data that is written to the first logical block address.

Accordingly, in some examples of the presently disclosed subject matter, the IO handler is responsive to receiving the second write request which includes the second write data that is associated with the first LBA for repeating, for example, blocks 507, 410, 520 and blocks 525-530 or blocks 625-630 (with or with out implementing blocks 722, 725 and 727 beforehand) or block 730 (with or with out implementing blocks 722 and 725 beforehand) for adding a second virtual address entry to the virtual address database 40, depending on the state of the deduplication database and depending on the implementation of the method. Adding a virtual reference entry can involve or trigger updates to other virtual address entries, for example, when due to the addition of the virtual address entry a reference counter of another virtual address entry is decremented, and thus, further updates of the virtual address database and/or of the deduplication database may be take place, as will be apparent from the description of certain examples of the presently disclosed subject matter, including but not limited to the process illustrated in FIG. 11 and described hereinbelow with reference to FIG. 11.

Thus for example, in case it is determined that the second write request includes write data that is identical to the write data with which the first virtual address entry is associated, blocks 625 and 630 can be implemented. Further by way of example, in case it is determined that the hash value for the second write data is equal to the hash value that was computed based on the first write data, blocks 722, 725 and 727 can be implemented, and in case it is determined that the first write data and the second write data are identical block 625 and 630 can be implemented, and if it is determined that the first write data and the second write data are not identical, block 730 can be implemented.

According to examples of the presently disclosed subject matter, in parallel or in series with the recordation of the second virtual address entry (in block 810), the validity indication of the first virtual address entry can be updated to indicate that the first write data is no longer the latest data that is written to the first LBA (block 815). In further examples of the presently disclosed subject matter, when a new virtual address entry that is associated with a certain LBA is added to the storage system, and it replaces a previous virtual address entry as the latest data that was written to that LBA, if the previous virtual address entry included a reference counter, the reference counter is decremented. In the scenario illustrated in FIG. 8, the reference counter in the first virtual address entry is decremented. It would be appreciated that it may still be necessary to maintain the first virtual address entry, for example, in case some other virtual address entry (e.g., one that is associated with a different LBA) is associated with the same write data as was the first virtual address entry, and that other virtual address entry points to the first virtual address entry which includes a pointer to the storage location of the first write data.

It would be appreciated that according to examples of the presently disclosed subject matter, it may still be necessary to maintain the first virtual address entry in the virtual address database, even after it no longer holds the latest data for the first LBA, because some other virtual address(es) which is associated with another LBA can still need the metadata (e.g. the pointer to the storage location of the write data) in the first virtual address entry. However, when the reference counter of a virtual address entry reaches '0' (or any other reference indicator indicates no current references), the virtual address database can be updated, and possibly the virtual address entry can be removed. Further by way of example, when the reference counter of the virtual address entry reaches '0' a request can be issued for the deduplication database to remove the entry which references the virtual address entry whose counter reached '0'. These operations are further illustrated in FIG. 11 and are described below with reference to FIG. 11.

Figure 9:
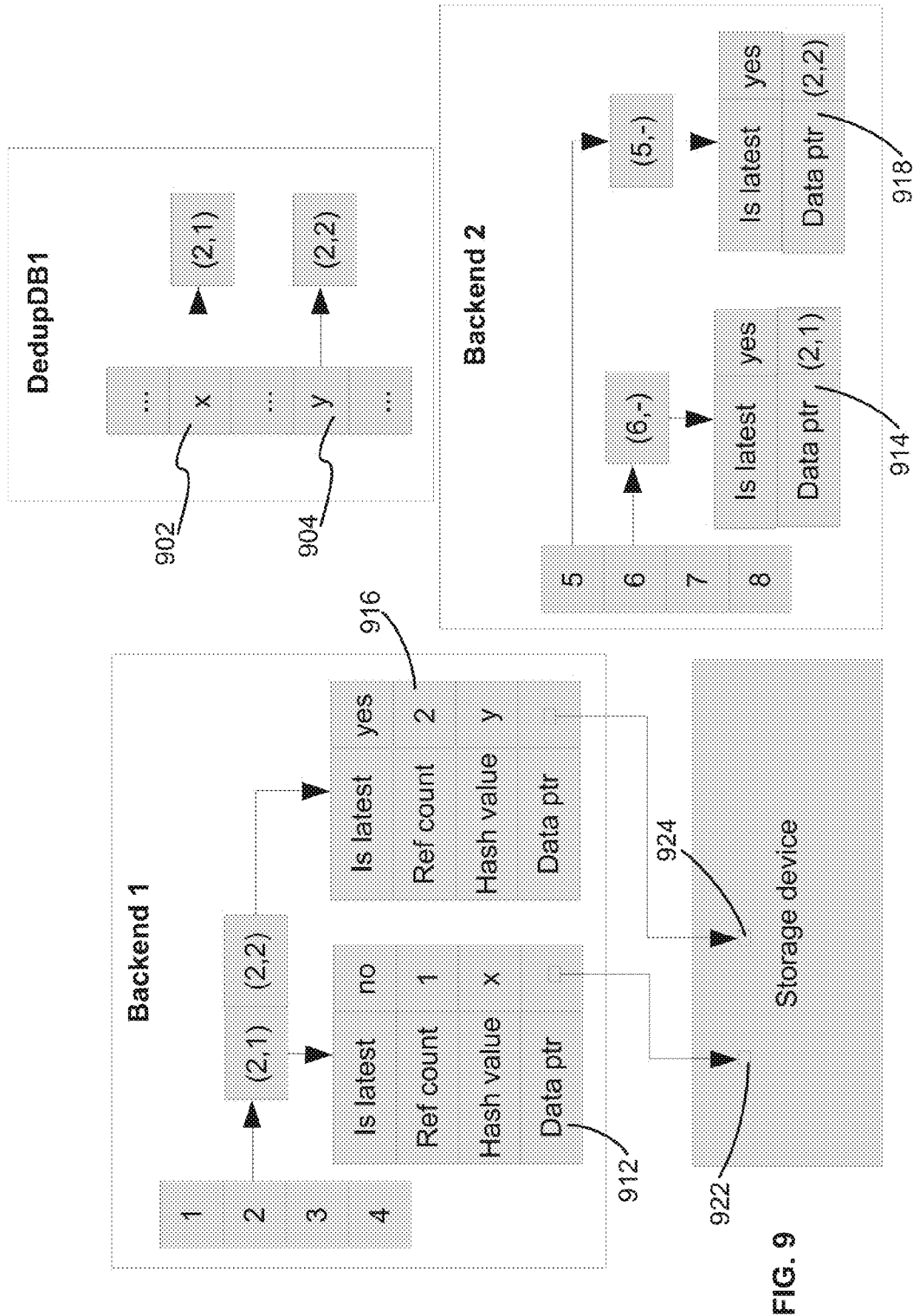
FIG. 9 is a graphical chart diagram illustration of the state of a virtual address database and the state of the deduplication database following the processing of four different write requests according to examples of the presently disclosed subject matter.

Reference is now made to FIG. 9, which is a graphical chart diagram illustration of the state of a virtual address database and the state of the deduplication database following the processing of four different write requests according to examples of the presently disclosed subject matter. For purposes of illustration assume that the storage system to which the example shown in FIG. 9 is referring has eight logical block addresses and two backend servers, BE1 is responsible for logical block addresses 1-4 and BE2 is responsible for logical block addresses 5-8.

The scenario which is illustrated by way of example in FIG. 9 starts with the receipt of a first write request which references LBA 2 at BE1. BE1 reserves deduplication ID 1. BE1 computes a hash value based on the write data in the first write request, say that the result is X. BE1 then sends a request to the deduplication database (dedeupDB1) to determine whether there is an existing virtual address entry that is associated with the hash value X. The response from the deduplication database indicates that there is not such virtual address entry. Accordingly, an entry 902 is added to the deduplication database which includes the hash values X and maps this hash value to the virtual address reference key (2, 1). The deduplication database then notifies BE1 about the creation of the entry, and in response, BE1 adds an entry 912 to the virtual address database for the first write data. The entry 912 for the first write data includes the virtual address reference key (2, 1) with a reference count that is initialized to 1, a validity indicator which indicates that this is the latest write data for LBA 2, and a pointer to a storage location 922 that is allocated for the first write data.

As is further shown in FIG. 9, sometime after the first write request is received and processed, a second write request is received at the storage system. The second write request references LBA 6 and is received at BE2. The second write request includes a second write data, which is identical to the first write data that was included in the first write request. Accordingly, the hash value that is computed by BE2 for the second write data is equal to the hash value that was computed for the first write data, namely it equals X. BE2 sends a request to the deduplication database (dedeupDB1) to determine whether there is an existing virtual address entry that is associated with the has value X. The response from the deduplication database indicates that virtual address entry 912 is already registered in the deduplication database in association with the hash value X. Accordingly, there is no need to add a further entry to the deduplication database in response to the second write request. The deduplication database then notifies BE2 that there is an existing virtual address entry (marked with the numeral 912 in FIG. 9) which is already associated with the hash value (X) that was included in the query from BE2. The deduplication database can include in the notification the virtual address reference key of the virtual address entry 912 which is already associated with the hash value (X) that was included in the query from BE2, which is in this case (2,1). In response to the notification from the deduplication database, BE2 adds an entry 914 to the virtual address database for the second write data. The entry 914 for the second write data includes the virtual address reference key (6, -), a validity indicator which indicates that this is the latest write data for LBA 6, and a pointer to the existing virtual address entry which is associated with the hash value that was computed for the second write data, which is in this case (2,1). In response to the creation of the virtual address entry 914 for the second write data, and since this virtual address entry 914 references the virtual address entry (2,1) (marked 912 in FIG. 9), the reference counter in the virtual address entry (2,1) is incremented to indicate that there is an additional virtual address entry (namely virtual address entry (6,-) (marked 914 in FIG. 9) which references the virtual address entry (2,1).

Continuing with the description of the sample scenario shown in FIG. 9, at some point after the second write request is received and processed, a third write request is received at the storage system. The third write request references LBA 2 and is received at BE1. BE1 reserves deduplication ID 2 (deduplication ID 1 is already taken). The third write request includes a third write data, which is different from the write data that was included in the first and second write requests. Accordingly, the hash value that is computed by BE1 for the third write data is different from to the hash value that was computed for the first and second write data, say it equals Y. BE1 then sends a request to the deduplication database (dedeupDB1) to determine whether there is an existing virtual address entry that is associated with the hash value Y. The response from the deduplication database indicates that there is not such virtual address entry. Accordingly, an entry 904 is added to the deduplication database which includes the hash values Y and maps this hash value to the virtual address reference key (2, 2). The deduplication database then notifies BE1 about the creation of the entry, and in response, BE1 adds an entry 916 to the virtual address database for the third write data. The entry 916 for the third write data includes the virtual address reference key (2, 2) with a reference count that is initialized to 1, a validity indicator which indicates that this is the latest write data for LBA 2, and a pointer to a storage location 924 that is allocated for the third write data. In addition, BE1 modifies the metadata stored in the virtual address entry (2,1) (marked 912 in FIG. 9) to indicate that it no longer points (directly or by pointing to another virtual address entry) to the latest version of the data for the respective LBA, namely LBA 2, and the reference counter is decremented. The decrement of the reference counter is preformed since the reference to the storage location of the write data is no longer needed for virtual address entry (2,1) (marked 912 in FIG. 9), and is now only needed for the virtual address entry (6,-). This state of virtual address entry (2,1) (marked 912 in FIG. 9) is the one that is illustrated in FIG. 9.

The fourth write request, for which there is reference in the sample scenario in FIG. 9, is received after the third write request is received and processed. The fourth write request references LBA 5 and is received at BE2. The fourth write request includes a fourth write data, which is identical to the third write data that was included in the third write request. Accordingly, the hash value that is computed by BE2 for the fourth write data is equal to the hash value that was computed for the third write data, namely it equals Y. BE2 sends a request to the deduplication database (dedeupDB1) to determine whether there is an existing virtual address entry that is associated with the has value Y. The response from the deduplication database indicates that virtual address entry 916 is already registered in the deduplication database in association with the hash value Y. Accordingly, there is no need to add a further entry to the deduplication database in response to the fourth write request. The deduplication database then notifies BE2 that there is an existing virtual address entry (marked with the numeral 916 in FIG. 9) which is already associated with the hash value (Y) that was included in the query from BE2. The deduplication database can include in the notification the virtual address reference key of the virtual address entry 916 which is already associated with the hash value (Y) that was included in the query from BE2, which is in this case (2,2). In response to the notification from the deduplication database, BE2 adds an entry 918 to the virtual address database for the fourth write data. The entry 918 for the fourth write data includes the virtual address reference key (5, -), a validity indicator which indicates that this is the latest write data for LBA 5, and a pointer to the existing virtual address entry which is associated with the hash value that was computed for the fourth write data, which is in this case (2,2). In response to the creation of the virtual address entry 918 for the fourth write data, and since this virtual address entry 918 references the virtual address entry (2,2) (marked 916 in FIG. 9), the reference counter in the virtual address entry (2,2) is incremented to indicate that there is an additional virtual address entry (namely virtual address entry (5,-) (referenced 918 in FIG. 9) which references the virtual address entry (2,2).

As mentioned above, according to examples of the presently disclosed subject matter, when a certain LBA is overwritten by new write data, a new virtual address entry is added and its validity indicator indicates that this is the latest version of the LBA with which the new virtual address entry is associated. In addition, in case the overwritten virtual address entry included a pointer which points to another virtual address entry, the addition of the new virtual address entry can trigger an update to the reference counter (as an example of a reference indicator) of the other virtual address entry. Referring to FIG. 9, assume that sometime after virtual address entry 918 is created, a new write request is received at the storage system which overwrites the data in LBA 5. The new virtual address entry is added to the virtual address database, and is marked as the latest data that is written to LBA 5. The validity indicator in the virtual address entry 918 is updated to indicate that, it is no longer associated with the latest data that is stored in the storage system for LBA 5. In addition, according to examples of the presently disclosed subject matter, the reference counter (as an example of a reference indicator) in the virtual address entry 916, which the virtual address entry 918 pointed to, is decremented. It would be appreciated that according to examples of the presently disclosed subject matter, the above updates to the virtual address database can, under certain circumstances, involve or trigger additional operations which include updating of the deduplication database and garbage collection, for example, as will be apparent from the description of certain examples of the presently disclosed subject matter, including but not limited to the process illustrated in FIGS. 10 and 11 and described hereinbelow with reference to FIGS. 10 and 11.

Figure 10:
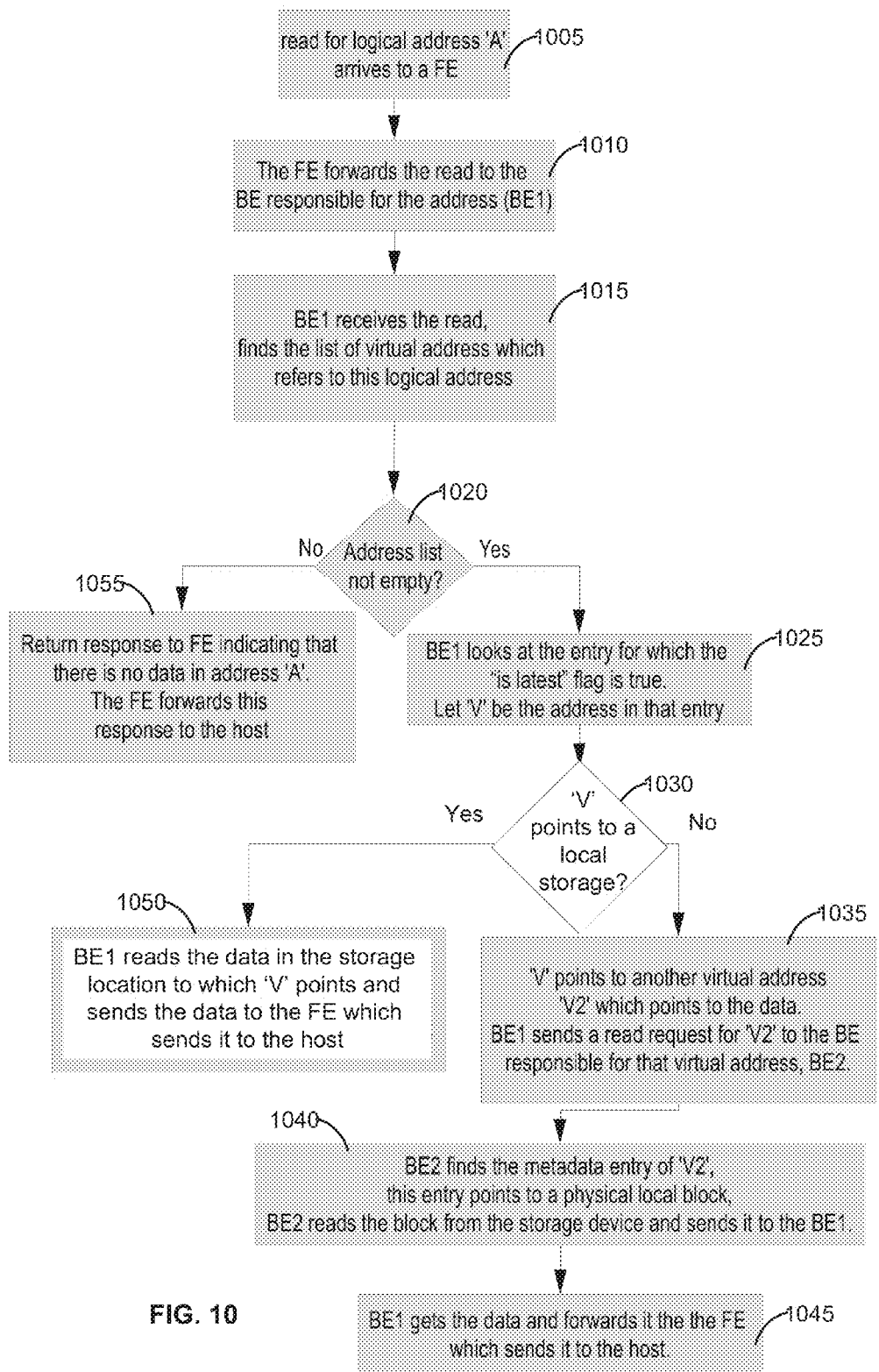
FIG. 10 is a flow chart illustration of a read flow which can be implemented as part of some examples of the presently disclosed subject matter.

According to examples of the presently disclosed subject matter, the data that is stored in the storage system can be ready using the data that is stored in the virtual address database. FIG. 10 is a flow chart illustration of a read flow which can be implemented as part of some examples of the presently disclosed subject matter. The read flow that is illustrated in FIG. 10 begins with a receipt of a read request which references a LBA 'A' at a FE server of the storage system (block 1005).

The FE server forwards the write request to the backend server that is associated with the LBA 'A' that is referenced in the write request (block 1010). According to examples of the presently disclosed subject matter, the BE server receives the read request, and can be configured to find the list of virtual address which refer to LBA 'A' that is referenced in the read request (block 1015). For example, the BE server builds a virtual address entries list which includes all the virtual address entries in the virtual address database which are associated with the LBA 'A'.

Next, the BE server determines whether there are virtual address entries in the list (block 1020). If there is no virtual address entry which are associated with the LBA 'A' in the list, the BE server returns a message to the FE indicating that this address was no yet written, and the FE can forward this reply to the host (block 1055).

Otherwise, if there is at least one virtual address entry in the list, the BE server can be configured to find among the virtual address entries which are associated with the LBA 'A', the virtual address entry for which the validity indicator indicates that this is the latest data that is written to LBA 'A' (block 1025). In FIG. 10, by way of example, the virtual address entry which is associated with the latest data that is written to LBA 'A' is referenced virtual address V'. As illustrated in FIG. 10, the validity indicator can be a "is latest" flag, which can either be 'true'—in case this virtual address entry is associated with the latest write data that is associated with LBA 'A', or it can be 'false'—in case this virtual address entry is not associated with the latest write data that is associated with LBA 'A'.

At block 1030 it is determined whether the entity 'V' that is associated with the latest data that is written to LBA 'A' includes a pointer to a local storage or not, or whether it includes a pointer to a storage location or to another virtual address entry.

Further by way of example, in case the virtual address entry 'V' points to a local storage, BE1 reads the data in the storage location to which 'V' points and sends the data to the FE which sends it to the host (block 1050).

Still further by way of example, in case the virtual address entry 'V' points to another virtual address entry 'V2' which points to a storage location of the data, BE1 can be configured to send a read request to BE 2 that is responsible for that virtual address entry to which there is a reference in 'V' (block 1035). It would be noted that the target BE may be the same BE as the one that got the read request.

Next, BE2 can be configured to find the in the virtual address entry 'V2' the pointer which points to the storage location of the requested data, read the data in the designated storage location, and send it to the BE 1 who initiated the request (block 1040).

BE 1 gets the data and can forward it to the FE which in turn can sends it to the host (block 1045). it would be appreciated that other operations and a different flow can be devised for reading the data from a storage system that is designed and constructed according to examples of the presently disclosed subject matter, and the process illustrated in FIG. 10, and described above with reference to FIG. 10, is an example of one possible implementation of a possible read flow.

As part of some examples of the presently disclosed subject matter, a garbage collection process can be implemented in combination with one or more implementations of the data write process which was described above, and possibly also in combination with the data read process that was described above. According to examples of the presently disclosed subject matter, garbage collection of old entries can be done online, or in further examples, garbage collection can be implemented offline.

By way of example, online garbage collection can be implemented when a new write renders an older write (i.e., an existing virtual address entry) unnecessary. Examples of virtual address entries that can be considered to be unnecessary are provided below. The online garbage collection can be invoked after the write process is complete.

Further by way of example, offline garbage collection is a process which is invoked manually or as part of a predefined routine (e.g., after a predetermined time, in response to a certain parameter meeting some criterion, etc.), and which iterates over virtual address entries which are stored in the virtual address database, and removes virtual address entries which are no longer needed.

In both the case of the online garbage collection and in the case of the offline garbage collection, a virtual address entry may be remove if it is in one of the following states:

If a reference indicator in the virtual address entry indicates that no virtual address entry references it. For example, in case a reference counter is used, when the reference counter equals '0'. In such a case, the data at the storage location which is pointed by this entry is deleted from the local storage and the deduplication database is notified, so that it can remove the entry for the respective hash value.

The entry is not deduplicated (i.e. it does not have a deduplication id), and its validity indication indicates that it is not the valid data for the LBA with which the virtual address entry is associated (e.g., a "is latest" flag is false). In such a case, if that virtual address entry points to local storage, the data pointed by this virtual address entry can be deleted from the local storage. Else, if that virtual address entry points to another virtual address entry (and the other virtual address entry points to the storage location of the data), the reference counter of the other virtual address entry which points to the storage location of the data can be decremented.

Figure 11:
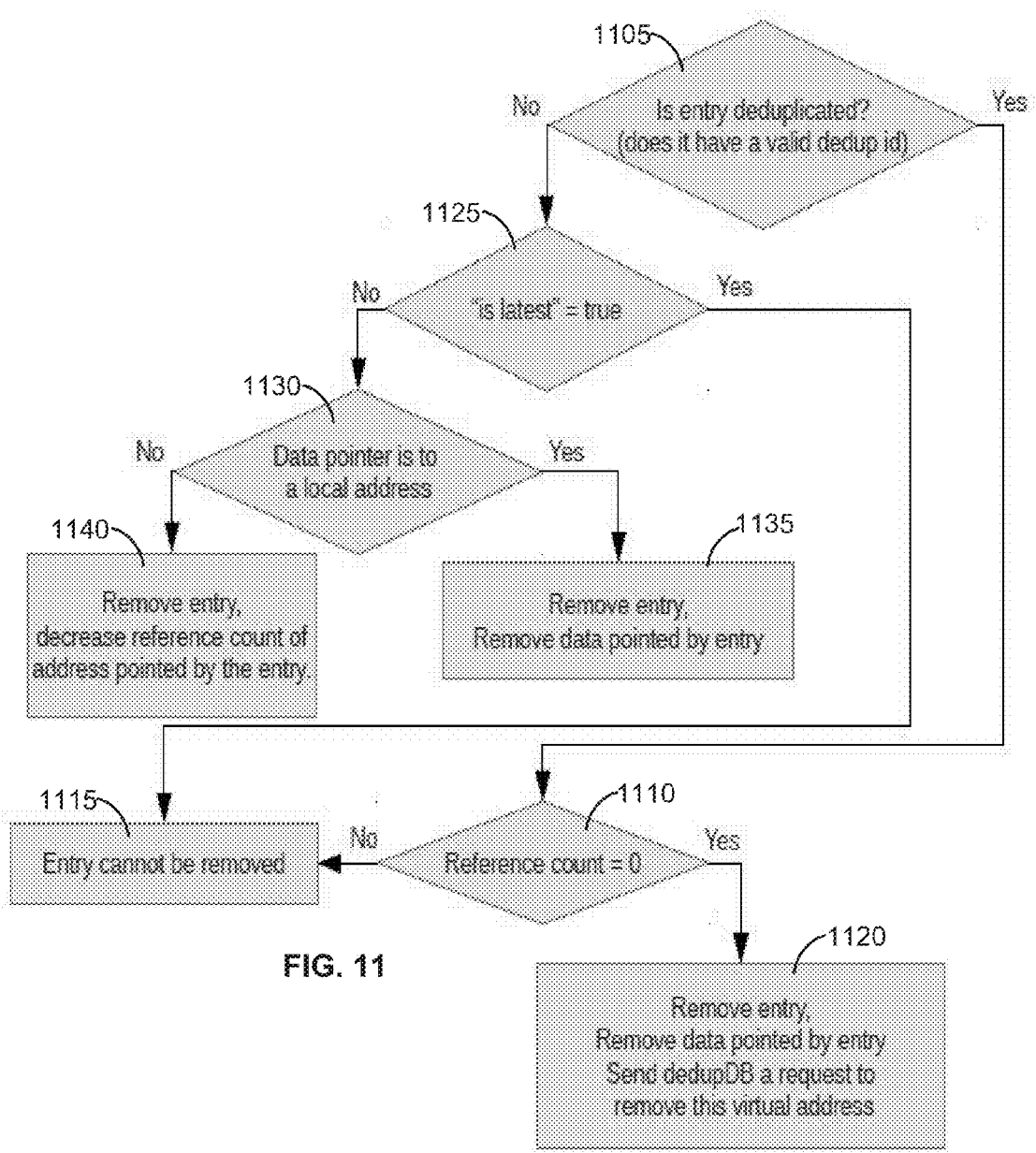
FIG. 11 is a flow chart illustration of a garbage collection process which can be implemented as part of some examples of the presently disclosed subject matter.

Referring now to FIG. 11, there is shown a flow chart illustration of a garbage collection process which can be implemented as part of some examples of the presently disclosed subject matter. The garbage collection process shown in FIG. 11 and described herein with reference to FIG. 11 refers to a single virtual address entry, but it would be appreciated that this process can be implemented many times in respect of different virtual address entries.

According to examples of the presently disclosed subject matter, initially it can be determined whether the (current) virtual address entry is deduplicated (block 1105). By way of example, a deduplicated virtual address entry, is one which has a valid deduplication ID.

According to examples of the presently disclosed subject matter, in case it is determined at block 1105 that the virtual address entry is deduplicated, the process flows to block 1110, where it is determined if the reference counter (as an example of a reference indicator) equals '0', or not. In other words, it is determined in block 1110 whether according to the metadata in the virtual address entry there is any virtual address entry in the storage system which includes a pointer to or requires the metadata in the present virtual address entry, including the virtual address entry itself (for example, if it holds the latest data of the respective LBA).

If at block 1110 it is determined that the reference counter is not equal to '0' (e.g., it equals 1 and above), or that the reference indicator indicates that the virtual address entry is need by at least one virtual address entry in the storage system, it is determined that the virtual address entry cannot be removed (block 1115), and the process can end with respect to this virtual address entry.

If however at block 1110 it is determined that the reference counter is equal to '0', the virtual address entry can be removed, and the data in the storage location that was pointed to by the pointer in the virtual address entry can be removed or can be marked as invalid, and further, a request can be communicated to the deduplication ID to update its data and remove the virtual address entry from the deduplication ID (block 1120).

Returning now to block 1105, if it is determined that the virtual address entry is not deduplicated, the validity indicator of the virtual address entry can be checked to determine whether the virtual address entry is associated with latest (or the valid) write data of the respective LBA (block 1125).

According to examples of the presently disclosed subject matter, if it is determined at block 1125, that the virtual address entry is associated with the latest write data of the respective LBA, the virtual address entry can not be removed (block 1115).

According to examples of the presently disclosed subject matter, if it is determined at block 1125, that the virtual address entry is not associated with the latest write data of the respective LBA, it is determined whether the pointer in the virtual address entry points to a local address (an actual storage location) or not (block 1130).

If at block 1130 it is determined that the pointer in the virtual address entry points to a local address, the virtual address entry can be removed and the data in the storage location to which the virtual address entry points can be deleted (block 1135).

If however at block 1130 it is determined that the pointer in the virtual address entry points to another virtual address entry, the pointed virtual address entry can be removed, and the reference indicator in the pointed virtual address entry is updated (e.g., a reference counter is decremented) (block 1140). In case a reference counter is used in the pointed virtual address entry, the reference counter is decremented.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. In a storage system comprising at least a first server and a second server, each server is assigned to access a respective storage location not accessible to the other server a method comprising:
   at the second server:
   receiving a write command including a write data that is associated with a logical block address;
   in respect of the write data:
      computing a hash value based on the write data;
      determining whether the hash value is already associated with an existing first virtual address entry, and if it is,
      providing a virtual address entry for the write data;
   wherein the first virtual address entry is stored at a storage location assigned to the first server, the first virtual address entry including:
      a first virtual address reference key which is a combination of the first logical block address and a first deduplication ID, wherein deduplication IDs are assigned such that within the scope of each logical block address each deduplication ID is unique;
      a reference indicator indicating whether or not there is at least one virtual address entry that is associated with the first virtual address entry;
      a first pointer pointing to a storage location, assigned to the first server, where the write data is stored; and
      the first virtual address entry further comprising a validity indicator indicating whether the first write data is the latest data that is written to the first logical block address and
   the virtual address entry including:
      a virtual address reference key which includes the logical block address;

a pointer pointing to the first virtual address entry stored at the storage location assigned to the first storage device; and storing the virtual address entry in a storage location assigned to the second server;

at the first server:

receiving a fourth write command including a fourth write data that is associated with the first logical block address;

computing a fourth hash value based on the fourth write data;

determining whether the fourth hash value is already associated with an existing virtual address entry, and if not, providing a fourth virtual address entry for the fourth write data;

maintaining the first virtual address entry; and updating the validity indicator of the first virtual address entry to indicate that the first write data is not the latest data that is written to the first logical block address.

2. The method according to claim 1, wherein the first virtual address entry for the first write data is provided after it is determined that the first hash value is not already associated with another existing virtual address entry.

3. The method according to claim 1, wherein the reference indicator is a counter which counts the number of virtual addresses that are associated with the first virtual address entry.

4. The method according to claim 3, wherein the number of virtual addresses which are associated with the first virtual address entry includes the first virtual address entry itself and any virtual address entry which references the first virtual address entry.

5. The method according to claim 1, further comprising determining whether the write data and the write data with which the existing first virtual address entry is associated are identical, and if they are, providing the virtual address entry including the virtual address reference key and the pointer which points to the existing first virtual address entry.

6. The method according to claim 1, wherein determining whether the hash value is already associated with an existing first virtual address entry, comprises if it is determined that the hash value is associated with an existing first virtual address entry assuming that the write data is identical to the write data that is associated with the existing virtual address entry, and thereby implementing said providing a virtual address entry.

7. The method according to claim 1, further comprising updating a reference indicator of the existing first virtual address entry to indicate that the virtual address entry is now associated with the first virtual address entry.

8. The method according to claim 1, wherein the virtual address reference key does not include a deduplication ID or includes a null deduplication ID.

9. The method according to claim 1, further comprising:
receiving a third write command at the storage system including a third write data that is associated with a third logical block address;

in respect of the third write data:
computing a third hash value based on the third write data;

determining whether the third hash value is already associated with an existing virtual address entry, and if it is, determining whether the third write data and the write data with which the existing virtual address entry is associated are identical, and if they are not identical, indicating that there is a deduplication collision involving the third write data.

10. The method according to claim 9, further comprising:
in response to detecting the deduplication collision providing a third virtual address entry for the third write data, including:
a third virtual address reference key which includes the third logical block address and an invalid-deduplication indication;
a third pointer pointing to a storage location where the third write data is stored.

11. The method according to claim 10, wherein said fourth virtual address entry includes:
a fourth virtual address reference key which is a combination of the first logical block address and a fourth deduplication ID, wherein the fourth deduplication ID is different from the first deduplication ID; and a validity indicator indicating that the fourth write data is the latest data that is written to the first logical block address.

12. A system, comprising: at least a first server and a second server, each server is assigned with a respective storage location not accessible to the other server;
a deduplication database;
the second server is configured to:
receive a write command including a write data that is associated with a logical block address;
compute a hash value based on the write data;
wherein in case the deduplication database already includes an existing deduplication database entry which is associated with the hash value, provide a virtual address entry for the write data;
wherein an existing first virtual address entry, referenced by the existing deduplication database entry, is stored at a storage location assigned to the first server, the first virtual address entry including:
a first pointer pointing to a storage location, assigned to the first server, where the first write data is stored;
wherein the first server is configured to further include in the first virtual address entry a validity indicator indicating whether the first write data is the latest data that is written to the first logical block address;
the virtual address entry, including:
a virtual address reference key which includes the logical block address;
a pointer pointing to the first virtual address entry stored at the storage location assigned to the first storage device;
and store the virtual address entry in a storage location assigned to the second server;
wherein the first server is configured to receive a fourth write command at the storage system including a fourth write data that is associated with the first logical block address, and in respect of the fourth write data, the first server is configured to:
compute a fourth hash value based on the fourth write data;
determine whether the fourth hash value is already associated with an existing virtual address entry, and if not, provide a fourth virtual address entry for the fourth write data, the fourth virtual address entry including: a validity indicator which indicates that the fourth write data is the latest data that is written to the first logical block address;
and further in association with receiving the fourth write command, the first server is configured to;
maintain the first virtual address entry; and
update the validity indicator of the first virtual address entry to indicate that the first write data is not the latest data that is written to the first logical block address.

13. The system according to claim 12, wherein the deduplication database is configured for storing a plurality of hash value entries, each one of the plurality of hash value entries is uniquely associated with a certain hash value and provides a mapping from the hash value to a specific virtual address reference key.

14. The system according to claim 12, wherein the reference indicator is a counter which counts the number of virtual addresses that are associated with the first virtual address entry.

15. The system according to claim 14, wherein the number of virtual addresses which are associated with the first virtual address entry includes the first virtual address entry itself and any virtual address entry which references the first virtual address entry.

16. The system according to claim 12, wherein in the case of the write data, the second virtual address reference key does not include a deduplication ID or includes a null deduplication ID.

17. The system according to claim 12, wherein the second server is further configured to obtain from the deduplication database a virtual address reference key of the existing first virtual address entry which is associated with the hash value, and wherein the pointer in the virtual address entry points to the existing first virtual address entry which is associated with the hash value.

18. The system according to claim 17, wherein the first server is further configured to update a reference indicator of the existing first virtual address entry to indicate that the virtual address entry is now associated with the existing first virtual address entry.

19. The system according to claim 12, wherein in case it is determined that the hash value is already associated with an existing first virtual address entry, the second server is configured to assume that the second write data is identical to the write data that is associated with the existing first virtual address entry.

20. The system according to claim 12, wherein the first server is further configured to update a reference indicator of the existing first virtual address entry to indicate that the virtual address entry is now associated with the existing first virtual address entry.

21. The system according to claim 12, wherein a given server in the storage system is configured to receive a third write command at the storage system including a third write data that is associated with a third logical block address, and in respect of the third write data, the given server is configured to:
   compute a third hash value based on the third write data;
   determine whether the third hash value is already associated with an existing virtual address entry, and if it is, the given server is configured to determine whether the third write data and the write data with which the existing virtual address entry is associated are identical, and if they are not identical, indicating that there is a deduplication collision involving the third write data.

22. The system according to claim 21, in response to determining that the third hash value is already associated with an existing virtual address entry, the given server is configured to:
   from the deduplication database obtain the virtual address reference key of the existing virtual address entry that is associated with the third hash value;
   from the virtual address database obtain the pointer in the virtual address entry which is associated the existing virtual address; and
   compare the data that is stored in the storage location pointed to by the pointer with the third write data.

23. The system according to claim 21, wherein in case it is determined that the third hash value is already associated with an existing first virtual address entry, but the third write data is not identical to the write data with which the existing virtual address entry is associated, the given server is configured to provide a third virtual address entry for the third write data, including:
   a virtual address reference key which includes the third logical block address and an invalid-deduplication indication;
   a pointer pointing to a storage location where the third write data is stored.

24. The system according to claim 12, wherein the first server is further adapted to include in the fourth virtual address entry a fourth virtual address reference key which is a combination of the first logical block address and a fourth deduplication ID, wherein the fourth deduplication ID is different from the first deduplication ID; and a validity indicator indicating that the fourth write data is the latest data that is written to the first logical block address.

25. A program storage device readable by machine, tangibly embodying a program of instructions executable by the machine to perform a method of providing deduplication in a storage system comprising at least a first server and a second server, each server is assigned to access a respective storage location not accessible to the other server, the method comprising:
   at the second server:
   receiving a write command including a write data that is associated with a logical block address;
   in respect of the write data:
   computing a hash value based on the write data;
   determining whether the hash value is already associated with an existing first virtual address entry, and if it is, providing a virtual address entry for the first write data;
   wherein the first virtual address entry is stored at a storage location assigned to the first server, the first virtual address entry including:
      a first pointer pointing to a storage location, assigned to the first server, where the first write data is stored;
   the virtual address entry including:
      a virtual address reference key which includes the logical block address;
      a pointer pointing to the first virtual address entry stored at the storage location assigned to the first storage device; and
   storing the virtual address entry in a storage location assigned to the second server.

26. The system according to claim 12 wherein the first virtual address entry is provided by the first server responsive to receiving a first write command, preceding the write request, the first write command including a first write data that is associated with a first logical block address, the first server is configured for providing the first virtual address entry to:
   compute a first hash value based on the first write data,
   wherein in case the deduplication database does not include an entry which is associated with the first hash value, the first server is configured to:
      provide the first virtual address reference key which is a combination of the first logical block address associated with the first data and a first deduplication ID, wherein deduplication IDs are assigned such that within the scope of each logical block address each deduplication ID is unique;

add to the deduplication database an entry which is uniquely associated with the first hash value and which references the first virtual address reference key; and add to the virtual address database, the first virtual address entry, including, in addition to the first pointer:
  the first virtual address reference key;
  a reference indicator indicating whether or not there is at least one virtual address entry that is associated with the first virtual address entry;
  store the first virtual address entry at a storage location assigned to the first server.

\* \* \* \* \*